United States Patent [19]

Hubner

[11] 3,887,859
[45] June 3, 1975

[54] SELF-COMMUTATING FREQUENCY CONVERTER WITH ADDITIONAL CHARGING ARRANGEMENT

[75] Inventor: Klaus Hubner, Erlangen, Germany

[73] Assignee: Siemens Aktiengesellschaft, Munich, Germany

[22] Filed: Apr. 25, 1974

[21] Appl. No.: 464,329

[30] Foreign Application Priority Data
Apr. 26, 1973 Germany............................ 2321199

[52] U.S. Cl. .................... 321/5; 318/341; 318/345; 321/45 C
[51] Int. Cl. ........................ H02m 7/48; H02m 5/44
[58] Field of Search............ 321/4.5, 45 C; 318/341, 318/345

[56] References Cited
UNITED STATES PATENTS
| | | | |
|---|---|---|---|
| 3,703,676 | 11/1972 | Frank...................................... | 321/5 |
| 3,705,341 | 12/1972 | Frank................................ | 321/45 C |
| 3,781,641 | 12/1973 | Rettig ................................. | 321/5 X |
| 3,824,446 | 7/1974 | Forster et al...................... | 321/45 C |

*Primary Examiner*—Gerald Goldberg
*Attorney, Agent, or Firm*—Kenyon & Kenyon Reilly Carr & Chapin

[57] ABSTRACT

An improvement in a static frequency changer (cycloconverter) of the type having a d-c link and in which the controlled rectifiers of each half bridge of a self-commutating converter are connected with each other through commutation capacitors, the improvement being a recharging arrangement in which each half bridge of the line-controlled converter is supplemented by uncontrolled rectifiers to form a semicontrolled rectifier bridge, with a capacitor shunted across the output of each semicontrolled rectifier bridges coupled through a resistor and a coupling diode to each electrode of each commutation capacitor of the corresponding half-bridge of the self-commutating converter.

4 Claims, 1 Drawing Figure

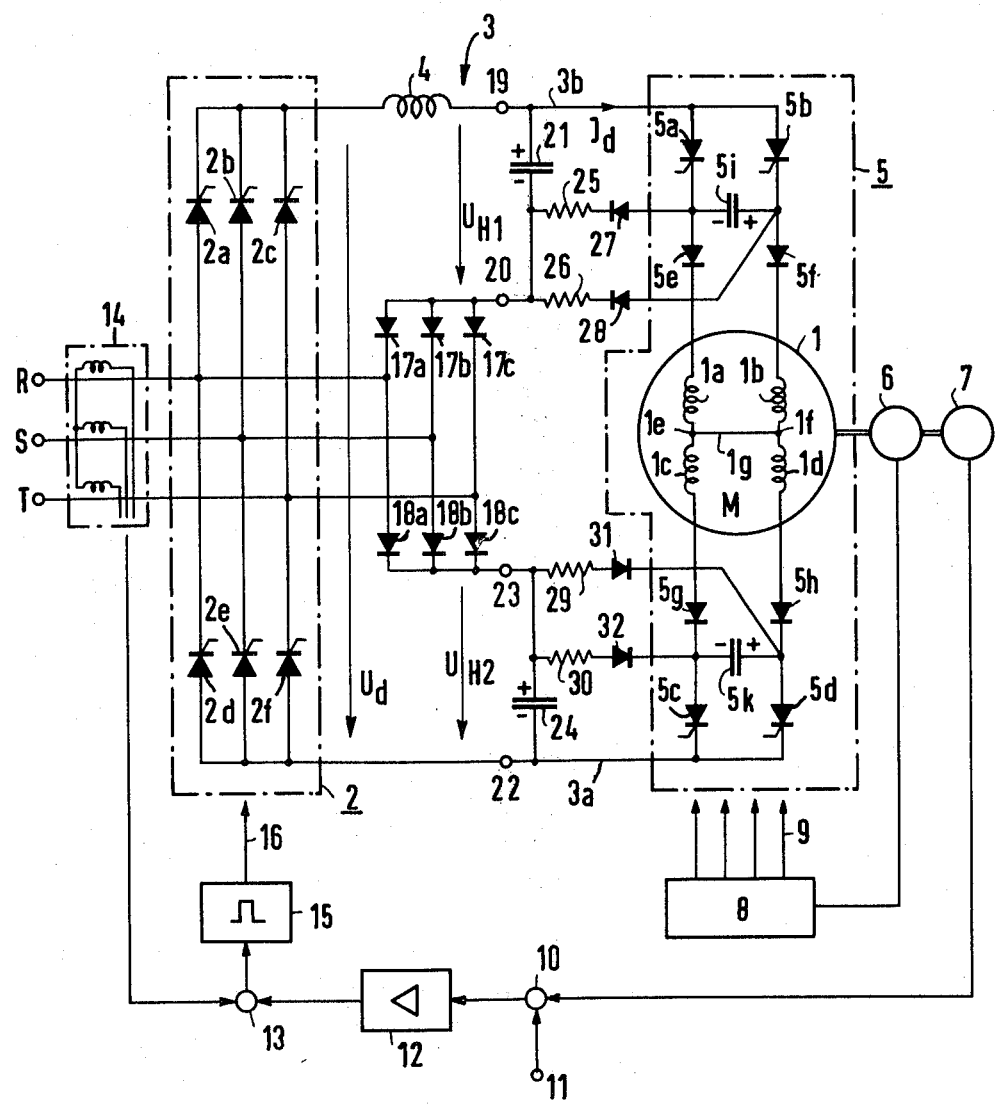

SELF-COMMUTATING FREQUENCY CONVERTER WITH ADDITIONAL CHARGING ARRANGEMENT

BACKGROUND OF THE INVENTION

This invention relates to static frequency changers (cycloconverters) in general, and more particularly to an improved charging arrangement for use in the type of static frequency changer having a line commutated controlled converter in a bridge circuit, a d-c link and a self-commutating converter and in which all controlled rectifiers in the converter tied to the same bus of the d-c link are connected with each other by commutation capacitors. It is also related to the application of a static frequency changer and directed particularly to an arrangement in which the self-commutating converter is in the form of a bridge circuit.

Static frequency changers of the self-commutating type are well known in the art and are described, for example, in "Thyristor-Handbook", published by Siemens-Schuckertwerke AG, 1965, pages 260 to 264. In this text, self-commutating converters of this type in both two phase and multi-phase design and which are in the form of a bridge circuit are described. In a self-commutating static frequency changer having a d-c link, the capacitors in the commutation circuit must always have a sufficient charge so that the maximum load current can be reliably commutated. This problem is particularly evident if a motor is controlled by the self-commutating static frequency changer in which the self-commutating inverter is load-dependently timed. At higher speeds $n$, i.e., where $n = 0.05\ n_n$ where $n_n$ is the nominal speed, the charging of the commutation capacitors through the d-c link is accomplished through what is referred to as power factor control. However, at speeds lower than this, and when the motor is standing still, charging energy must be supplied to the commutation capacitors externally. One method of doing this is described in Siemens Zeitschrift 1965, pages 254 to 257. In the arrangement disclosed therein, separate charging chokes are provided for this purpose, through which chokes the motor current flows. In another known method, the commutation capacitor of a summation quenching arrangement is recharged through a transformer and separate rectifier. It is evident that these prior art methods for charging self-commutating frequency changers require expensive additional components. If the static frequency changer is of a small rated output and is to be used, for example, with low power drives, the additional cost of the expensive components associated with these prior art charging circuits decreases the economic viability and makes the use of such frequency changers questionable.

Thus, it can be seen that there is a need for a simpler design for a charging circuit in a static frequency changer of this nature which can be inexpensively implemented and thus, permit static frequency changers of small rated output to be economical.

SUMMARY OF THE INVENTION

The present invention solves this problem by supplementing the controlled rectifiers of at least one half bridge of the line controlled converter with uncontrolled rectifiers to form a semicontrolled rectifier bridge. In the preferred embodiment, two such semicontrolled bridges are formed. The output of each semicontrolled rectifier bridge is shunted by a capacitor. The output from the uncontrolled side of each bridge is connected through respective resistors and decoupling diodes to each electrode of the commutation capacitor associated with the side of the self-commutating converter which is tied to the same bus bar of the d-c link circuit as the controlled rectifiers in that semicontrolled rectifier bridge.

The static frequency changer of the present invention is preferably used for supplying power to a motor. With the disclosed arrangement, an economical converter motor of low power can be built. Converter motors as defined herein are to be generally considered to be rotating-field machines of the synchronous type which are supplied from a single or three-phase system of constant voltage and frequency through a self commutating frequency changer with a d-c link circuit and in which the timing of the self-commutating converter depends on the load.

The self-commutating static frequency converter of the present invention provides a charging arrangement which can be implemented without the need for expensive additional components such as transformers or chokes. At the same time, while eliminating these expensive components, the reactive commutation power for the frequency changer is still ensured. This is particularly important when supplying motors through the self-commutated frequency changer since through the recharging arrangement of the static frequency changer of the present invention, the reactive commutation power for the self-commutating converter or inverter is provided even when the motor operated at low motor speeds or is at a standstill and regardless of the direction of rotation of the motor.

BRIEF DESCRIPTION OF THE DRAWINGS

The single FIGURE is a circuit diagram of a static frequency changer according to the present invention.

DETAILED DESCRIPTION OF THE PREFERRED EMBODIMENT

The single FIGURE is a schematic diagram of a static frequency changer according to the present invention. In the illustrated arrangement, the frequency changer is shown driving a synchronous machine 1. The basic elements of the frequency changer include a line-controlled converter or rectifier 2, a d-c link 3 which includes a smoothing inductance 4 and a self-commutating converter 5. In the illustrated embodiment, the line-controlled converter 2 comprises six controlled rectifiers 2a through 2f which are fed from the phases R, S and T of a three-phase line. The self-commutating converter or inverter 5 consists of controlled rectifiers 5a through 5d and uncontrolled rectifiers 5e through 5h arranged in a two-phase, four-pulse bridge or series circuit. This is an arrangement known in the prior art and described in the above referenced "Thyristor Handbook". In the inverter portion 5, each of the controlled rectifiers 5a through 5d is connected in series with one of the uncontrolled rectifiers 5e through 5g in each half of a bridge branch. As illustrated, the controlled rectifiers 5a through 5d are connected to one of the bus bars 3a or 3b in the d-c link circuit 3. The controlled rectifiers 5a and 5b are connected to each other through a commutation capacitor 5i and the controlled rectifiers 5c and 5d through a commutation capacitor 5k. As described in the above text "Thyristor Handbook", this is a conventional arrangement in which each controlled rectifier of a half-bridge is connected with each other controlled rectifier of the same half bridge through a separate commutation capacitor. With an arrangement such as this, no additional semiconductor components, such as reactive-current diodes, need be provided in the inverter 5. This is true, since the static frequency changer with the d-c link circuit operates with an impressed current in the link. The controlled rectifiers 2a through 2f and 5a through 5d may, for example, be thyristors. Diodes may be used as the uncontrolled rectifiers 5e through 5h.

The illustrated synchronous motor 1 has two phases with four circuits in four windings designated 1a through 1d. The winding branch made up of windings 1c and 1e is connected between the uncontrolled rectifiers 5e and 5g. The other winding branch made up of the windings 1b and 1d is connected between the uncontrolled rectifiers 5f and 5h. The junctions 1e and 1f between the windings in each branch are connected together by a line 1g. The motor typically will be a permanent magnet excited synchronous machine.

Mechanically coupled to the rotor of motor 1 is a rotor position transducer 6 which may be a well known type of device equipped with Hall effect generators, and a tachometer generator 7. The signals from the rotor position tranducer 6 are provided as inputs to a logic stage 8 which provides outputs on lines 9 to control the controlled rectifiers 5a through 5d in the inverter 5 in dependence on the signals from the rotor position transducer 6. Logic stages such as logic stage 8 are well known in the art and are described, for example, in German Pat. No. 1,240,980 and in German Offenlegungsschrift No. 2,035,955. The output signal of the tachometer 7 is compared at a summing junction 10 with a speed reference value provided to an input 11. Here, the difference between actual and desired speed is determined with the difference provided as an input to a speed control 12. The output of the speed control 12 is provided to a further summing junction 13 where it is compared with the output signals of a current transformer 14 which is arranged in the three phase supply lines R, S, and T. The output of the summing junction 13 is provided as an input to a current regulator and control unit 15 which provides outputs on a line 16 to control the firing of the converter rectifiers 2a through 2f. The design of the speed control 12 and the current regulator and control unit 15 is also disclosed in German Offenlegungsschrift No. 2,035,955.

What has been described to this point is clearly a known arrangement. However, as noted above, the previous manner of charging commutation capacitors 5i and 5k in arrangements such as this, required a number of expensive circuit elements. The present invention provides charging for the capacitors 5i and 5k through a semicontrolled rectifier arrangement. Two separate semicontrolled three-phase bridge circuits are formed. The first of these uses the controlled rectifiers 2a through 2c in combination with supplementary uncontrolled rectifiers 17a through 17C. The second is made up of the controlled rectifiers 2d through 2f along with the supplementary uncontrolled rectifiers 18a through 18c. The output of the first semicontrolled rectifier appears across the terminals 19 and 20 and that of the second semicontrolled rectifier across the terminals 22 and 23. Across the terminals 19 and 20 is placed a smoothing capacitor 21 and across the terminals 22 and 23 a smoothing capacitor 24. The output terminal 20 which is on the uncontrolled side of the first bridge is coupled to both electrodes of the commutation capacitor 5i through series circuits comprising resistors 25 and 26 and diodes 27 and 28. In like fashion, terminal 23 of the second bridge circuit is coupled through a resistor 29 and decoupling diode 31 to one side of the capacitor 5k and through a resistor 30 and decoupling diode 32 to the other side of the capacitor 5k. In this arrangement for charging, each individual inverter or each half bridge of the self-commutating inverter 5 is thus associated with a separate semicontrolled rectifier bridge. That semicontrolled rectifier bridge and its associated half-bridge of the inverter always cooperate. Stated another way, the semicontrolled rectifier bridge whose controlled rectifiers 2a through 2c are connected to the d-c bus 3b always cooperates with the bridge half in the inverter 5 whose controlled rectifiers 5a and 5b are coupled to the same bus 3b. Similarly, the other semicontrolled bridge whose controlled rectifiers 2d through 2f are coupled to the other d-c bus 3a always cooperates with that bridge half of the inverter 5 having the controlled rectifiers 5c and 5d coupled to that same d-c bus 3a. The uncontrolled rectifiers 17a through 17c and 18a through 18c may be diodes. The resistance of the resistors 25, 26, 29 and 30 will be selected depending on the capacity of capacitors 5i and 5k and the desired charging time constant in well known fashion. In general, the values of the resistances and capacities will be chosen so that the time constants of all R-C members formed by the resistors 25, 26, 29 and 30 in combination with the capacitors 5i and 5k are equal. Since the commutation capacitors generally will be of equal capacitance, the resistances of all the resistors 25, 26, 29 and 30 will also generally be equal.

The manner in which the charging circuit of the present invention functions can best be seen through the use of some examples. During one current period, pairs of converter rectifiers will sequentially conduct current as follows: 5a and 5c; 5a and 5d, 5b and 5d; and 5b and 5c, after which, 5a and 5c will again conduct. The commutation in the two individual bridge halves of the inverter 5 always takes place shifted by one quarter-period.

If, for example, the load current $I_d$ is flowing through the controlled rectifiers 5a and 5c and commutation from the rectifier 5c to 5d is then required, the commutation capacitor 5k must initially be charged to the polarity shown on the FIGURE. After the rectifier 5d is turned on and becomes conducting, the capacitor 5k discharges in the direction of conduction of the rectifier 5d and in a direction opposite to the conduction direction of the rectifier 5c, thereby extinguishing the latter. This type of commutation process is referred to as phase-sequence extinction. If half a period later, commutation from the rectifier 5d to the controlled rectifier 5c must take place, the capacitor 5k must be charged to a polarity which is opposite to that shown on the FIGURE.

With reference to the controlled rectifiers 5a and 5b, the commutation capacitor 5i must be charged to the polarity shown for commutation of current from the converter rectifier 5b to the rectifier 5a. For commutation in the reverse sequence, the polarity must be reversed in the manner described above in connection with capacitor 5k. These conditions necessary for commutation also apply when the motor is stopped and must start up from a standstill.

The d-c voltage $U_d$ at the input to the d-c link 3 increases proportionally with the speed n of the motor 1. Since, as a result of the d-c link circuit, the load of the rectifier 2 is inductive, the input voltage $U_d$ changes as a function of the control angle $\alpha$ according to a cosine function. Since for $n \approx 0$, $U_d$ is also approximately 0, the corresponding control angle is $\alpha \approx 90°$ el. As a result, only control angles between $0° < \alpha < 90°$ el are thus required for the operation of the static frequency changer.

The manner in which charging occurs will now be explained with reference to the commutation capacitor 5k. It will be recognized that a similar charging process takes place with respect to the other capacitor 5i. As noted above, each of the semicontrolled rectifier bridges is shunted by a capacitor with the second bridge made up of the controlled rectifiers 2d through 2f and uncontrolled rectifiers 18a through 18c shunted by the capacitor 24 which thus smooths the output voltage $U_{H2}$ of that bridge. Since the charging resistors 29 and 30 represent an Ohmic load for the semicontrolled three-phase bridge circuit and since, on the other hand, the firing angle for the rectifiers 2d through 2f is never larger than 90° el, a voltage which is at least $U_{H2} = 0.5\, U_d$ will always appear across the capacitor 24. This follows from the relationship that $U_d = 0.5\, U_{di}$ for $\alpha = 90°$ el, which is obtained from the control characteristics of a semicontrolled three-phase bridge circuit having an ohmic load and in which $U_{di}$ is the ideal d-c voltage of the three-phase bridge circuit.

Assume that the motor 1 is standing still and that the rectifier 5c in the lower half of the bridge of the inverter 5 is conducting. The firing angle for the rectifiers of the line-controlled converter 2 at this point is at the inverter transition limit $w = 90°$ el. The commutation capacitor 5k is charged to the polarity indicated on the FIGURE through the resistor 29 and decoupling diode 31 and the conducting rectifier 5c. If the rectifier 5d is then fired, the capacitor 5k reverses in the manner described above extinguishing rectifier 5c and the current is commutated to the converter rectifier 5d. After commutation, the commutation capacitor 5k is charged to a polarity which is opposite that shown as required through the resistor 30, the decoupling diode 32 and the rectifier 5d which is now conducting.

Preferably, the control 15 will include a delay circuit to make sure that the firing angle $\alpha$ for the rectifiers of converter 2 can decrease toward smaller values, i.e., load current will begin to flow only when the voltage at the commutation capacitor 5k has reached the value $U_{H2}$. The required delay is a function of the charging time constants of the R-C members 29 and 5k, or 30 and 5k, respectively. Similarly, the speed or frequency changer frequencies at which the capacitors will be charged to a sufficient value without need for external charging is determined by this charging time constant. Delay circuits of this nature can be implemented through the use of time delay relays of the type having a delayed pickup for releasing the control.

Operation of the upper half of the bridge of the inverter 5 containing the rectifiers 5a and 5b and commutation capacitor 5i occurs in similar manner. In that case, the semicontrolled rectifier bridge circuit made up of the controlled rectifiers 2a through 2c and the uncontrolled rectifiers 17a through 17c provides the necessary charging voltage designated $U_{H1}$. In a manner similar to that described above, this voltage charges the capacitor 5i either through the resistor 26, the decoupling diode 28 and the current-carrying rectifier 5a or through the resistor 25, the decoupling diode 27 and the current-carrying rectifier 5b. With regard to the delay in the change of the firing angle $\alpha$, the charging time constant of the R-C members formed by the resistors 25 and 26 and the commutation capacitor 5i is here again the governing factor.

In the embodiment described, a two-phase self-commutating inverter was used as an example. The frequency changer according to the present invention can also be used with a multi-phase inverter such as an inverter having a three-phase bridge circuit. An inverter of this nature is described in the above referenced "Thyristor Handbook". In that case, a voltage at the output terminals 20 and 23 of the semicontrolled rectifier bridges is brought to each electrode of the commutation capacitors present through respective charging resistors and decoupling diodes. For a three-phase bridge circuit, a further series circuit comprising an additional charging resistor and decoupling diode is thus required for each half of the inverter.

In summary, an improved frequency changer offering numerous advantages has been disclosed. The frequency changer includes a charging circuit which can be implemented at low cost but which will still provide proper charging in a low speed range and when the motor is at a standstill. The frequency changer according to the present invention can be used not only in converter motors but, with suitable modification of the frequency changer controls, can also be used to operate asynchronous motors. Similarly, other types of inductive load can be supplied with the output of the frequency changer of the present invention. These and other modifications may be made without departing from the spirit of the invention which is intended to be limited solely by the appended claims.

What is claimed is:

1. In a static frequency changer comprising a line commutated controlled converter configured as a rectifier bridge, a d-c link circuit and a self-commutating converter, in which self-commutating converter all controlled rectifier valves which are tied to the same bus of the d-c link circuit are connected with each other through commutation capacitors, wherein the improvement comprises:
   a. a first set of supplementary uncontrolled rectifiers coupled to at least one half of the bridge of the line commutated converter so as to form a first semicontrolled rectifier bridge having as one terminal one bus of the d-c link circuit and as another terminal, the output of said uncontrolled rectifiers;
   b. a smoothing capacitor shunted across said one and another terminals;
   c. first series circuits each comprising a resistor and a decoupling diode coupling said another terminal to one side of each said commutation capacitor associated with controlled rectifiers in the self-commutating converter which are coupled to the bus of said d-c link forming said one terminal; and
   d. second series circuits each comprising a resistor and a decoupling diode coupling said another terminal to the other side of each of said commutation capacitors.

2. A static frequency changer according to claim 1 wherein the output of said self-commutating converter is coupled to a motor.

3. A static frequency changer according to claim 1 and further including a second set of uncontrolled rectifiers forming with the other half of the bridge of said line controlled converter a second semicontrolled rectifier bridge having as one terminal the other bus of the d-c link circuit and as another output terminal the output of said second set of uncontrolled rectifiers and third and fourth series circuits each comprising a resistor and decoupling diode coupling said another terminal of said second semicontrolled rectifier bridge respectively to the two sides of each of said commutation capacitor associated with controlled rectifiers in said self-commutating converter which are coupled to said other bus of said d-c link.

4. A stativ frequency changer according to claim 2 wherein the output of said self-commutating converter is coupled to a motor.

* * * * *